Jan. 11, 1966    LA CLARE B. BOLES ETAL    3,228,182
AUTOMATIC REGULATOR FOR TIMEPIECE
Filed Nov. 27, 1963    3 Sheets-Sheet 1
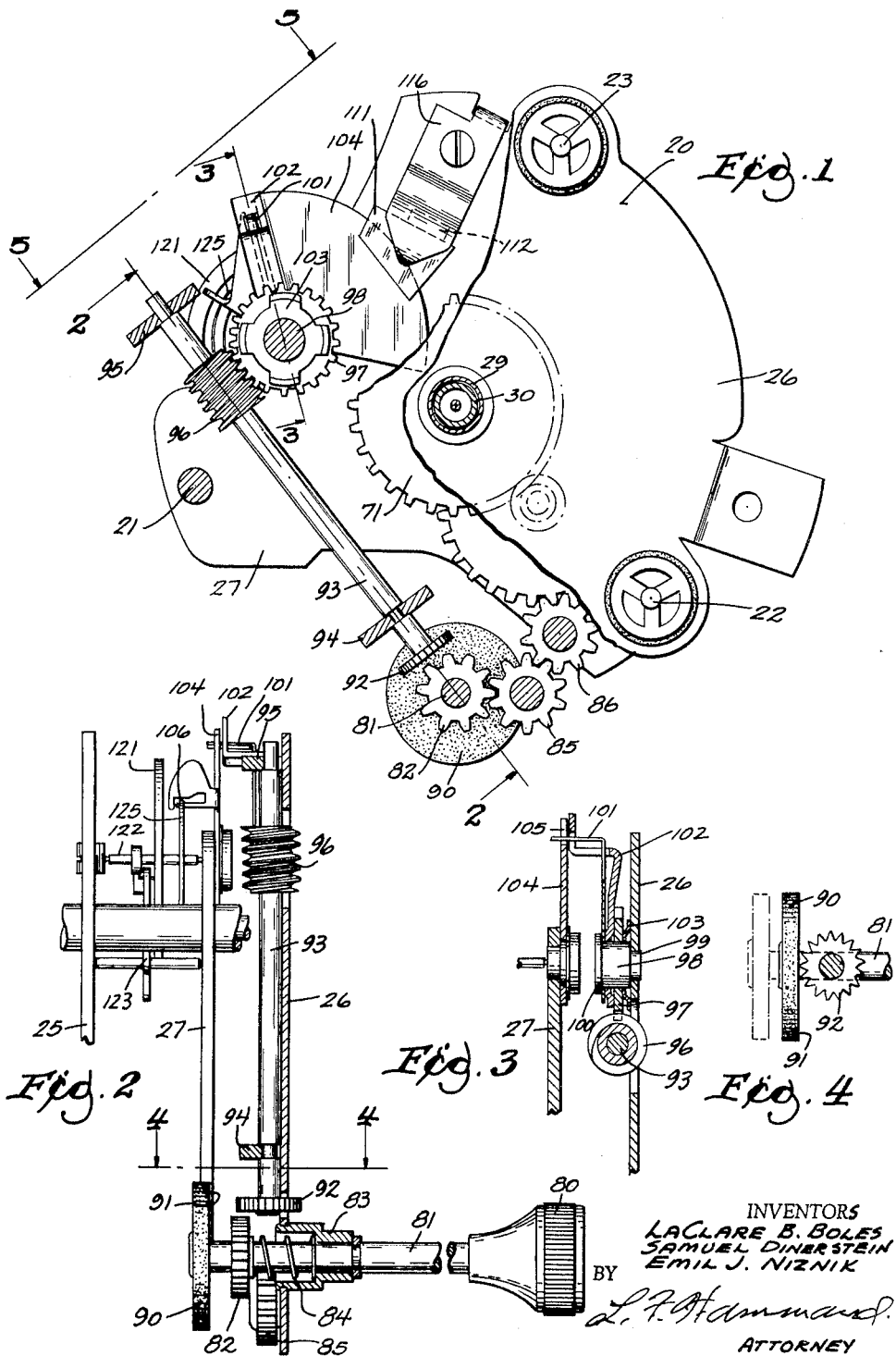
INVENTORS
LaCLARE B. BOLES
SAMUEL DINERSTEIN
EMIL J. NIZNIK
BY
L. P. Hammond
ATTORNEY Jan. 11, 1966 LA CLARE B. BOLES ETAL 3,228,182
AUTOMATIC REGULATOR FOR TIMEPIECE
Filed Nov. 27, 1963 3 Sheets-Sheet 2
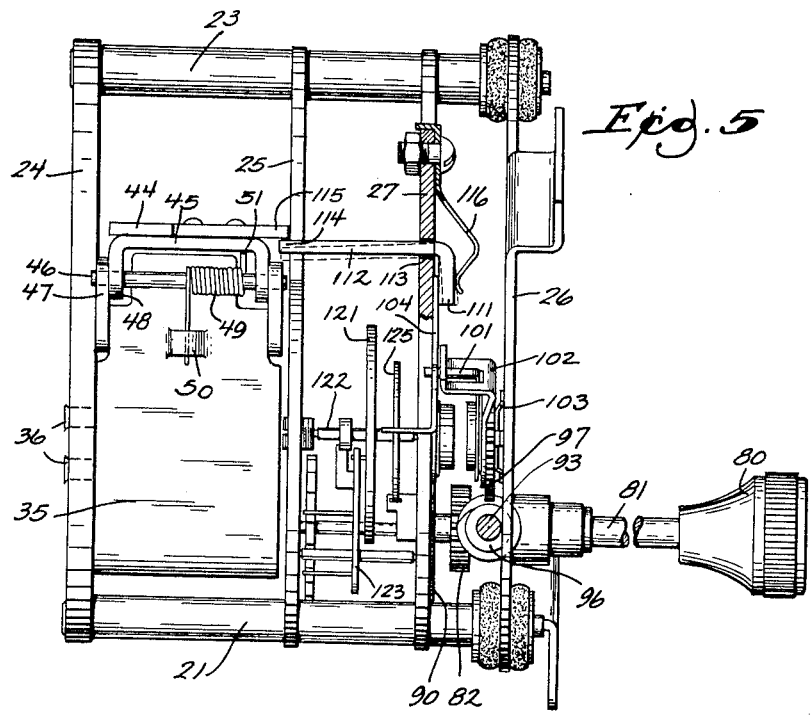
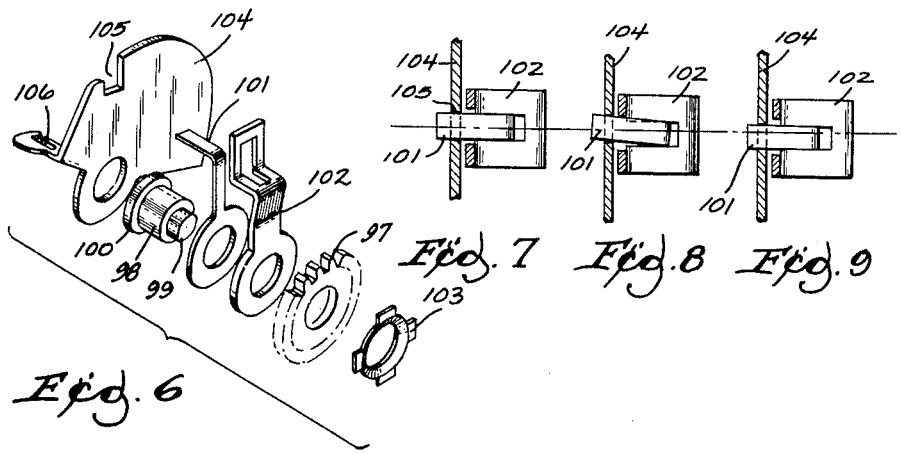
INVENTORS
LaCLARE B. BOLES
SAMUEL DINERSTEIN
BY EMIL J. NIZNIK
ATTORNEY

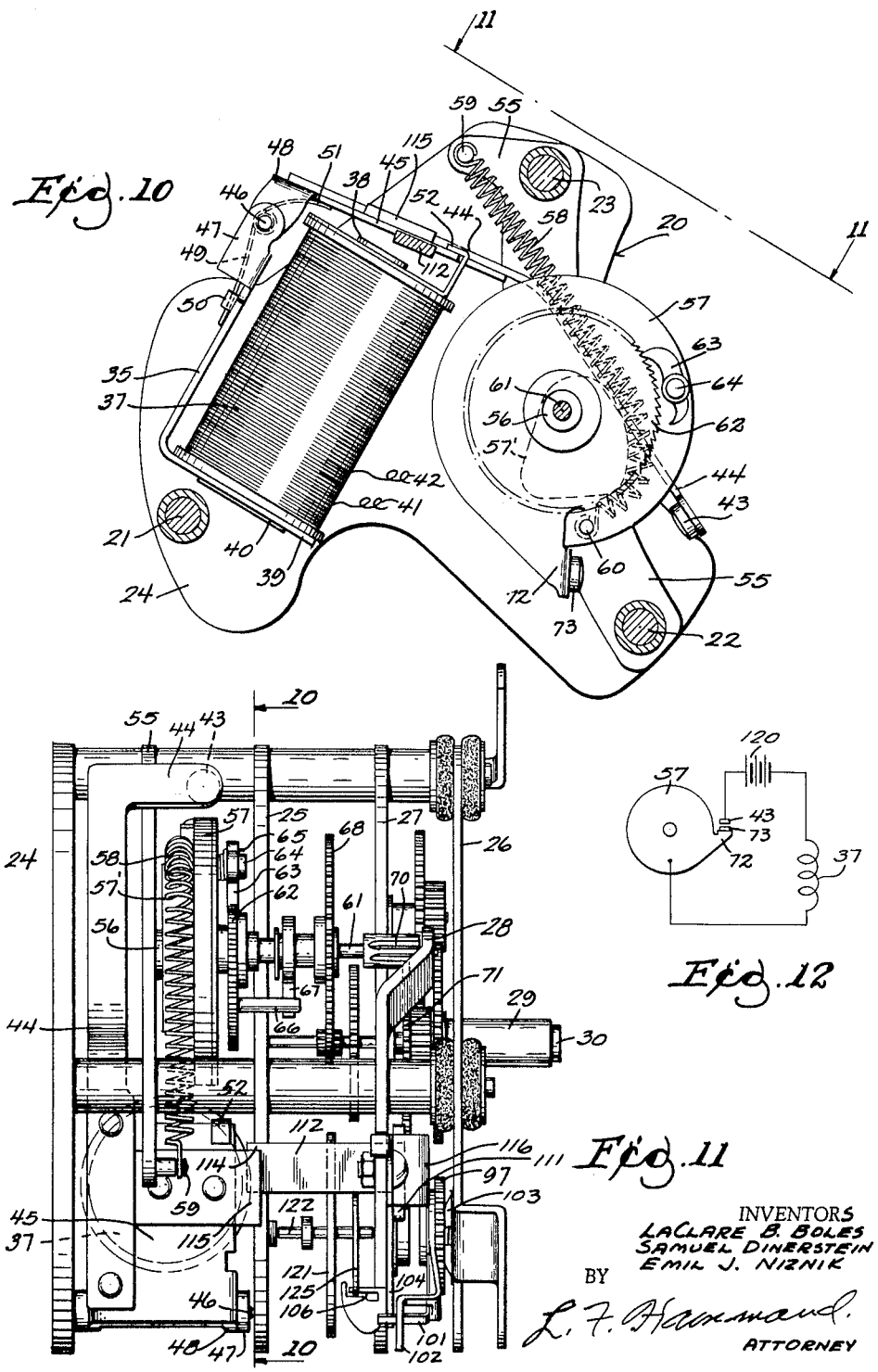

United States Patent Office 3,228,182
Patented Jan. 11, 1966

3,228,182
AUTOMATIC REGULATOR FOR TIMEPIECE
La Clare B. Boles, Delavan, Samuel Dinerstein, Lake Geneva, and Emil J. Niznik, Williams Bay, Wis., assignors to Amphenol Corporation, a corporation of Delaware
Filed Nov. 27, 1963, Ser. No. 326,580
1 Claim. (Cl. 58—85.5)

This invention relates to improvements in automatic regulation of timepieces and this application is a continuation-in-part of our copending application Serial No. 13,107, filed March 7, 1960.

The principal feature of the invention claimed herein relates to the divorcement from the regulatory rate control of the instrument of the backlash and uncertain maintenance of any given setting of the rate adjustment mechanism, so that the timepiece may be relied upon to maintain proper rate adjustment after such adjustment is once made.

It has been found that while various types of automatic regulators are reasonably capable of bringing a timepiece into proper adjustment of the running rate thereof, there is a very serious problem of maintaining the rate adjustment unchanged once it has been accomplished. While this is sometimes due to faulty design wherein under certain conditions operation of the clock movement or the gear train thereof can transmit a biasing force or actual motion to the regulator, it is more often caused by the continued and sometimes severe vibration to which automobile clocks are inherently subjected.

In timepieces of conventional construction, the continued effects of vibration and shock, coupled with the effects of constantly changing forces of inertia encountered in a rapidly moving road vehicle, have been found to result in "drifting" or "creeping" of the rate regulating devices so that even after a clock is properly regulated, it does not stay properly regulated, but may soon develop inaccuracies that must be compensated for by further adjustment.

It is the primary object of the present invention to overcome this difficulty by provision of an automatic regulator wherein the adjusting means of the regulator is normally locked in a manner to restrain it from any material change in adjustment, yet is nevertheless capable of adjusting movement when required.

In the drawings:

FIGURE 1 is a plan view of a portion of a timepiece movement; a frame plate being partially broken away to show mechanism related to hand setting and rate regulation;

FIGURE 2 is a section on line 2—2 of FIGURE 1;
FIGURE 3 is a section on line 3—3 of FIGURE 1;
FIGURE 4 is a section on line 4—4 of FIGURE 2;
FIGURE 5 is a side elevation of the movement shown in FIGURE 1, the view being taken on line 5—5 of FIGURE 1;
FIGURE 6 is an exploded view in perspective of the parts centered upon a shaft the axis of which is aligned with but separate from the balance wheel shaft of the movement;
FIGURES 7, 8 and 9 are detail views, in sequence, of the biasing spring and its action in relation to its immediately associated parts;
FIGURE 10 is a section on line 10—10 of FIGURE 11 showing the motive parts of a timepiece movement with which the invention is related.
FIGURE 11 is an elevation viewed on line 11—11 of FIGURE 10.
FIGURE 12 is a diagrammatic view of the circuit for electrification of the spring tensioning apparatus of the electrically wound clock.

In its broadest aspects, the present invention provides means (specifically, a brake) to normally hold the regulator fixed and immovable, yet with automatic means to shift the regulator to a new position of adjustment (when required) by a single, short, quick movement accomplished during a momentary period of release of the brake. In the timepiece 20 which is shown in the drawings as an environment in which the invention is disclosed for illustrative purposes, the brake is released (at least enough for a biasing spring to shift the regulator) at split-second intervals corresponding to each operation of a magnet employed to wind the clock spring.

The illustrated clock has a frame comprising posts 21, 22 and 23 extending through and between frame plates 24, 25 and 26, plus a plate 27 which includes a bracket-like bridge 28. Generally speaking, the timepiece movement is located between plates 25 and 27. The power equipment for operating the movement is located between plates 24 and 25 and the hour and minute wheels and their associated parts for driving hour shaft 29 and minute shaft 30 are arranged between plates 26 and 27.

Because the electric coil and magnet used to wind the clock also operate the automatic regulator of this invention, a more detailed description of the power apparatus for the clock movement is here described. Mounted to plate 24 (which is of dielectric fiber material) is an L-shaped frame 35, each leg of which is secured to the plate 24 by a set of riveted projections 36, one set of which is shown in FIGURE 5. A coil 37 having its core 38 riveted to one leg 39 of the frame 35 at 40 is provided with electric leads 41 and 42 which are in series connection with a battery or other source of current as shown in FIGURE 12 and as described below, and are in series with a set of contact points, one of which at 43 is mounted on the end of an armature arm 44 secured to armature 45. This armature is hingedly secured to frame 35 at 46 where it will be seen that a pair of hinge members 47 and 48 are provided with a pintle about which is wound a torsion spring 49 braced to the frame 35 at 50 and bearing against armature 45 at 51 so as to constantly bias the armature and the arm 44 away from core 38. The limit to which the spring 49 may bias the armature away from core 38 is determined by an armature stop 52 as shown in FIGURE 10. A power plate 55 (see FIGURE 11) supports one end of a shaft at 56 which supports in turn an impulse wheel 57 on the side of which at 57' there is a cam. Against the peripheral margin of this cam is laid a spiral helical spring 58, one end of which is anchored at 59 to a pin extending from plate 55, the other end of which is secured to the impulse wheel by means of pin 60 adjacent the extreme lobe of the cam away from center about which the impulse wheel is mounted to oscillate (see FIGURE 10). Then since the shaft 56 of the impulse wheel is tubular, a solid shaft 61 extending into the tubular shaft 56 at the left as seen in FIGURE 11, and extending into bearing relation with the bracket 28 of plate 27 is in position to provide for free rotation thereon of ratchet wheel 62 in position to be actuated upon by ratchet wheel 62 in position to be actuated upon by ratchet 63 mounted upon a pin 64 extending outwardly from a peripheral position upon the impulse wheel 57. A suitable torsion spring at 65 causes the pawl 63 to bear upon the ratchet wheel resiliently at all times. Thus when the ratchet drives the ratchet wheel, a driving pin 66 extending into engagement with a torsion spring 67 on shaft 61 carries the driving force to shaft 61 and to center wheel 68 for the movement. Pinion 70 on shaft 61 is in position for engagement with minute wheel 71 on minute shaft 30. Conventional connection between the minute wheel and the hour wheel and the hour shaft are provided in the space between plates 26 and 27 as above generally referred to.

There is upon the impulse wheel a bracket at 72 upon which there is so aligned an electric contact point 73 that as the armature arm and its contact point 43 receive the sudden impulse of a pull by coil 37 and its core 38, the points are forced together still more forceably and the impulse wheel is given an inertia impulse to throw it to the position shown in FIGURE 10 wherein the spring 58 is tensed to a practical extreme over the contour of cam 57 and when the inertia of the impulse wheel is overcome by the spring, the pawl 63 takes hold of the ratchet 62 for continued clock movement operation which, during the spring winding inertia interval has been maintained in operation by torsion spring 67.

When in the operation of the clock movement the spring has approached its unwound position and point 73 is brought in contact with contact point 43, the circuit shown in FIGURE 12 is again re-established for another spring winding operation.

It will be understood that the hands of the clock are mounted upon the minute shaft 30 and the hour shaft 29 in the usual way and that their associated minute wheel and hour wheel are in such relation to the clock movement which drives them with friction drive elements therebetween that the hands may be moved by manual control means for resetting purposes independent of the movement of the timepiece.

To accomplish this there is a hand setting knob 80 on setting stem 81 provided with a pinion 82 fixed thereon. Since stem 81 is reciprocably mounted through plate 26 in a cupped bearing mount 83, a spring 84 partially housed in the cup of the bearing mount normally biases the stem carried assembly to the position shown in FIGURE 2. However, when the stem 81 is manually pulled to the right as seen in that view the setting pinion 82 is axially slidable into mesh with the first of a series of pinions and gears 85, 86 in a conventional manner to connect the stem with the hands of the clock for setting purposes. Manual rotation of knob 80 and stem 81 will then adjust the hands of the clock to the desired position and to correct the setting as needed, and it is in connection with this manual operation of the hands to correct for slow operation of the clock movement or for fast operation that this invention is involved.

At the same time that the pinion 82 is pulled into mesh with gear 85 by the manual pulling action on knob 80, a friction disc 90 is pulled into such a position as to cause its face 91 to bear against a knurled or roughened wheel 92. This wheel 92 is fixed upon worm wheel shaft 93 extending parallel with plate 26. Spaced bearings 94–95 are fixed with relation to plate 26 and position the worm shaft 93 so that its worm 96 is meshed with worm wheel 97.

It will assist in the clarification of the description of the parts now to be described if attention is directed to FIGURES 1, 2 and 6 where it will be seen that worm wheel 97 is mounted freely upon the cylindrical hub-like portion 98 of headed stub shaft 100; the riveted end 99 of the stub shaft being extended through plate 26. Other parts assembled on this same cylindrical face 98 of stub shaft 100 include L-shaped torsion spring limiting bracket 102 (then the worm wheel 97), and finally, between the worm wheel 97 and the plate 26 there is a spring washer 103.

As shown in FIGURE 3 the parts 101, 102, 97 and 103 are frictionally contacted with one another upon the headed stub shaft 100 because of the bias of spring washer 103. Therefore, when worm wheel 97 is rotated, torsion spring 101 and torsion spring limiting bracket 102 tend to frictionally follow the movement of the worm wheel to the extent permitted by the fan 104, since the tip of the L-shaped torsion spring extends into notch 105.

In accord with this invention the fan is normally held by the firm clamping retention of releasable holding means illustrated as consisting of a brake shoe 111 (see FIGURES 1 and 5) bearing on the outer arcuate edge portion of the fan and pressing it against plate 27 with enough force to preclude any shifting. The brake is normal to, and integral with brake arm 112 extended loosely through an opening in plate 27 at 113 so that the end of the brake arm at 114 is in alignment with fiber (insulator) extension 115 of armature 45 but in the at rest position of these parts 114 does not bear against this armature extension. Means for providing bias assuring adequate pressure on brake shoe 111 to prevent oscillation of the fan 104 comprises an arched leaf spring 116 (shown most clearly in FIGURE 5).

From this description it will be seen that any oscillation of pinion 97 will, to the extent of the resulting friction drive of such pinion 97 against bracket 102 oscillate this bracket so as to torsionally establish bias in spring 101 tending to oscillate fan 104. FIGURES 7, 8 and 9 illustrate the degree to which the spring 101 is distorted, and in comparison of FIGURES 8 and 9, it will be seen that the jaws of the bracket in spaced relation to the edges of the spring 101 determine the limit of distortion. However, fan 104 cannot oscillate because brake 111 is adequately biased to prevent it from oscillating. In a given rotation of knob 80 while the pinion 97 is responsive to hand setting gear 85 the spring 101 can be stressed and held in stressed position as shown in FIGURE 8, but no resulting adjustment of fan 104 will take place unless and until coil 37 is energized and the pull of the armature 45 causes the fiber extension of the armature to bear against brake arm 112 at 114 and release the brake 111. This release is extremely momentary and tests have shown that the release period is of the order of $\frac{1}{80}$ of a second.

The purpose of this divorcement of the fan adjustment from the manual adjustment of knob 80 and its associated parts such as the friction drive between disc 91 and wheel 92, between worm 96 and gear 97 and between spring 101 and bracket 102 is that each of these inter-relationships of parts involve backlash or uncertain driving effects.

In contrast to timepieces of conventional construction, the adjusting fan 104 of the present clock is effectively locked against any substantial "creeping" or "drifting" and rendered largely immune to vibration and shock, even when long continued or unduly severe. It follows that when once properly adjusted, the clock will stay at its proper running rate indefinitely, and will not tend to develop inaccuracies with the passage of time.

As shown in FIGURE 12 the electric circuit for "winding" the clock includes contact point 73 carried by the impulse wheel 57 and the contact 43 on the end of the armature 44. When these contact points are in abutment, they complete a circuit through a battery 120 through the coil 37 and back to contact point 73. When the spring 58 is placed in tension so as to drive the movement of the clock, balance wheel 121 on its arbor 122 controls a suitable escapement including palate 123 so that the arbor and the balance wheel will oscillate under control of hair spring 125. Then because the outer coil of the hair spring passes through fan hair spring slot at 106 of the fan 104, the rate of movement is controlled by the fan.

The operation of the clock mechanism relative to spring winding is now understood at least in the sense that spring 58 is retensioned each time that the spring motivates the clock movement sufficiently to bring the contact points 43 and 73 into circuit completing contact. In one particular clock interval between spring retensioning operations of the armature 45 is two and a half minutes.

Assuming that the clock equipped with the elements of this invention is several minutes "fast" in that the minute hand on shaft 29 points to a dial calibration two minutes ahead of the true time indication, the operator of the clock will pull the setting knob and stem 80–81 to the right as seen in FIGURE 2. This will move pinion 82 into mesh with gear 85 and the setting gear train will be responsive to rotation of the setting knob to correct the position of the hands. Coincident with the complete meshing of pinion 82 with gear 85, the face 91 of disc 90 will be in contact with wheel 92 on worm shaft 93 so that the rotation of knob 80 will also rotate worm 96, and as worm wheel 97 commences to rotate the torsion spring will be frictionally moved with it. However, the tip of the torsion spring extending into notch 105 of brake held fan 104 will prevent the torsion spring from following bracket 102 very far and the parts will assume positions as in FIGURE 8. Thereupon any further movement of the knob 80 or its connected parts may rotate the minute shaft 29, and worm wheel 97 may continue to rotate in continuance of the movement, but the friction between parts 97, 102 and 101 will not be adequate to overcome the resistance of the braked fan.

From the foregoing it will be apparent that the present invention provides unique and effective means to overcome a serious difficulty often encountered by more conventional timepieces, by provision of an automatic regulator wherein the adjusting means of the regulator is normally firmly held in a manner to restrain it from any unwanted change in adjustment, yet is subject to momentary release whereby it is nevertheless capable of readjustment if ever required.

Having thus described our invention, what we claim as new and desire to secure by United States Letters Patent is:

A timepiece having, in combination, readout means including at least one rotary shaft driving hour and minute indicators;

driving mechanism for said shaft including a gear train coupled to said shaft and moving an escapement and balance wheel;

a manually rotatable setting stem adapted to be coupled to the hour and minute indicators;

a spirally coiled hair spring parallel to and coaxial with said balance wheel for governing the running rate of the timepiece;

a regulator including a pivotally mounted segmental adjusting fan parallel to and coaxial with said balance wheel and angularly shiftable with respect thereto; said fan having a gate portion extending toward the balance wheel engaged with an outer coil of said hair spring and shiftable therealong to change the running rate of the timepiece;

means for continually holding said regulator against angular shifting of the gate portion of the regulator during all running time of the timepiece except during intervals which are determined by the manual operation of the setting stem when the hour and minute indicators are adjusted;

said holding means including vibration resistant means acting through an outer portion of said segmental adjusting fan to hold the gate portion of the regulator immovable against creep-producing effects of inertia, vibration and shock;

means for overcoming said holding means during said intervals so that the regulator may be adjusted angularly in either direction depending upon the direction of manual operation of the setting stem; and means engaging the regulator and connectable with the setting stem and responsive to movement thereof for adjusting the regulator angularly as determined by the manual operation of the setting stem, but operative only during said intervals.

References Cited by the Examiner
UNITED STATES PATENTS 3,112,605   12/1963   Boles et al. _____ 58—85.5

LEO SMILOW, *Primary Examiner.*

JOSEPH STRIZAK, *Examiner.*